(12) United States Patent
Wu et al.

(10) Patent No.: US 7,664,095 B2
(45) Date of Patent: Feb. 16, 2010

(54) SYSTEMS AND METHODS FOR REGISTERING A CLIENT DEVICE IN A DATA COMMUNICATION SYSTEM

(75) Inventors: John Wu, San Diego, CA (US); Thanh Khai Ong, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 824 days.

(21) Appl. No.: 10/600,295

(22) Filed: Jun. 20, 2003

(65) Prior Publication Data
US 2004/0258046 A1    Dec. 23, 2004

(51) Int. Cl.
H04L 12/26    (2006.01)
(52) U.S. Cl. ...................................................... 370/352
(58) Field of Classification Search ................. 370/313, 370/328, 338, 389, 392, 395.3, 475; 455/410, 455/411
See application file for complete search history.

(56) References Cited

U.S. PATENT DOCUMENTS

| | | | |
|---|---|---|---|
| 6,614,788 B1* | 9/2003 | Martin et al. ................ | 370/392 |
| 6,625,461 B1* | 9/2003 | Bertacchi ..................... | 455/466 |
| 6,866,587 B1* | 3/2005 | Lane ............................. | 463/43 |
| 2001/0005675 A1* | 6/2001 | Aho .............................. | 455/412 |
| 2002/0089968 A1* | 7/2002 | Johansson et al. ........... | 370/328 |
| 2003/0108172 A1* | 6/2003 | Petty et al. ............. | 379/142.08 |
| 2004/0121785 A1* | 6/2004 | Vance et al. ................. | 455/466 |
| 2004/0136358 A1* | 7/2004 | Hind et al. ................... | 370/352 |
| 2005/0020234 A1* | 1/2005 | Iivari et al. .................. | 455/403 |
| 2005/0050148 A1* | 3/2005 | Mohammadioun et al. .. | 709/206 |
| 2006/0031488 A1* | 2/2006 | Swales ........................ | 709/224 |

\* cited by examiner

Primary Examiner—Anh-Vu Ly
(74) Attorney, Agent, or Firm—Foley & Lardner LLP (57) ABSTRACT

A two-way wireless communication system comprises a central authority in communication with a plurality of client devices via both a circuit switched data communication system and a packet switched data communication system. The packet switched communication system can assign packet switched network addresses to the client devices dynamically. Therefore, the central authority can be configured to send a circuit switched message, through the circuit switched data network, to a client device requesting the client device to register with the central authority through the packet switched data network.

32 Claims, 9 Drawing Sheets

| 700a | 700b | 700c | 700d |
|---|---|---|---|
| 3 Chars | 3 Chars | 15 Chars | 5 chars |
| RCP | 100 | 168.130.4.121 | 5555 |

702

| 702a | 702b | 702c |
|---|---|---|
| 3 Chars | 3 Chars | 10 Chars |
| RCP | 200 | 8588120629 |

704

| 704a | 704b | 704c | 704d |
|---|---|---|---|
| 3 Chars | 3 Chars | 10 Chars | 10 chars |
| RCP | 101 | 8588120629 | 144502197 |

706

| 706a | 706b | 706c | 706d | 706e |
|---|---|---|---|---|
| 3 Chars | 3 Chars | 10 Chars | 15 chars | 6 chars |
| RCP | 201 | 8588120629 | 192.168.1.100 | 92287 |

708

| 708a | 708b | 708c | 708d | 708e |
|---|---|---|---|---|
| 3 Chars | 3 Chars | 10 Chars | 6 chars | 1 char |
| RCP | 102 | 138750385 | 739472 | 1 |

710

| 710a | 710b | 710c |
|---|---|---|
| 3 Chars | 3 Chars | 10 Chars |
| RCP | 202 | 8588120629 |

| 712a<br>3 Chars | 712b<br>3 Chars | 712c<br>10 Chars | 712d<br>10 chars |
|---|---|---|---|
| RCP | 103 | 8588120629 | 8434892904 |

714

| 714a<br>3 Chars | 714b<br>3 Chars | 714c<br>10 Chars | 714d<br>15 chars | 714e<br>6 chars |
|---|---|---|---|---|
| RCP | 203 | 8588120629 | 168.130.4.121 | 80034 |

716

| 716a<br>3 Chars | 716b<br>3 Chars | 716c<br>10 Chars | 716d<br>15 chars | 714e<br>6 chars |
|---|---|---|---|---|
| RCP | 300 | 8588120629 | 168.130.4.121 | 80034 |

718

| 718a<br>3 Chars | 718b<br>3 Chars | 718c<br>10 Chars | 718d<br>15 chars | 714e<br>6 chars |
|---|---|---|---|---|
| RCP | 301 | 8588120629 | 168.130.4.121 | 80034 |

SYSTEMS AND METHODS FOR REGISTERING A CLIENT DEVICE IN A DATA COMMUNICATION SYSTEM

BACKGROUND

1. Field of the Inventions

The field of the invention relates generally to wireless data communication and more particularly to registering a client device in a wireless data communication system that dynamically assigns network addresses.

2. Background Information

Modern communications systems can be classified into two categories, circuit switched and packet switched. In a circuit switched network, a central switching computer typically establishes connections when communications are established between two devices. Circuit switched network are best suited for delivering information that is continuous, such as voice, music or video. In a packet switched network, packets of data are potentially routed through a plurality of routing devices. Packet switched networks are best suited for delivering information that is burst-like, such as email, web pages, and telemetry. In contrast to the central switching computer each routing device need only know to which device it needs to send the packet to next. As a result, all devices on a circuit switched network have a fixed, essentially permanent (henceforth static) address. An example of such a network is a phone system where the addresses are phone numbers. Devices on a packet switched network may have static address, but with the over abundance of devices on packet switched networks such as the Internet, many service providers ration out address to active devices. These address are often dynamic and can change each time a device becomes active. A typical packet switched network can employ the Internet Protocol (IP) often in conjunction with the transmission control protocol (TCP), jointly referred to as TCP/IP.

A common method of assigning IP addresses to devices is through the Dynamic Host Configuration Protocol (DHCP). A device sends a request to its service provider who issues it an IP address in response. In many applications, devices on a network have a client-server relationship. Many client devices are linked to a server, or a few servers. A server cannot initiate contact with a client device without the client device's IP address. Complicating the ability of a server to track a client device is the fact that the client device's IP address is often valid for only a fixed period of time referred to as a DHCP lease. In some implementations, upon expiration, this lease can be renewed, however, the renewal can result in a different IP address being assigned to the same client device.

An example application of a client-server system is that of a telemetry system. In a telemetry system, client devices are often scattered across several communication service providers and are configured to gather predetermined information such as power usage. On a network with static IP addresses, a central authority can query each device when required. In a network with dynamic IP addresses, however, it cannot initiate contact without the client device's IP address, which may have changed since the last time a particular client device was queried.

In certain implementations, the client devices can use wireless communication links to communicate with the server. In 3rd Generation (3G) wireless communications systems, for example, IP data communications are supported; however, due to the shortage of IP addresses, client devices on these networks are often issued addresses dynamically, e.g. using DHCP. As mentioned above, this can complication communications in certain systems, such as telemetry systems, because the server or servers cannot keep track of the dynamically assigned IP addresses of the client devices. Client devices configured to communicate over 3G communication system often include the capability of receiving data messages over a circuit switched mobile phone network, such as short message services (SMS) messages. Unfortunately, however, constant communications over a circuit switched network for short bursts of data, such as in a telemetry system, is not very efficient and can put a strain on the infrastructure. Therefore, certain systems, such as telemetry systems, may not be able to fully realize the advantage of 3G wireless communication systems.

In many applications, particularly those using wireless networks, security is an additional concern. The nature of IP communications can, in some cases, reduce the transmission security. A properly secure network should at a minimum preserve the integrity of the communications. In addition, a secure network can also protect the privacy of the messages from eavesdropping.

SUMMARY OF THE INVENTION

A two-way wireless communication system comprises a central authority in communication with a plurality of client devices via both a circuit switched data communication system and a packet switched data communication system. The packet switched communication system can assign packet switched network addresses to the client devices dynamically. Therefore, the central authority can be configured to send a circuit switched message, through the circuit switched data network, to a client device requesting the client device to register with the central authority through the packet switched data network. When the client device registers, it can be configured to provide its current packet switched network address to the central authority.

These and other features, aspects, and embodiments of the invention are described below in the section entitled "Detailed Description of the Preferred Embodiments."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

The systems and methods described herein include protocols and methods for wireless two-way communications over a packet switched data network, where the packet switched network addresses of client devices are not known at all times. In the descriptions of the embodiments set forth below, the packet switched network address of client devices are often IP addresses. This is not a limitation, however, on the type of network or its addressing schemes. In an embodiment where the packet switched data network is not an IP network, an equivalent address can be used.

Figure 1:
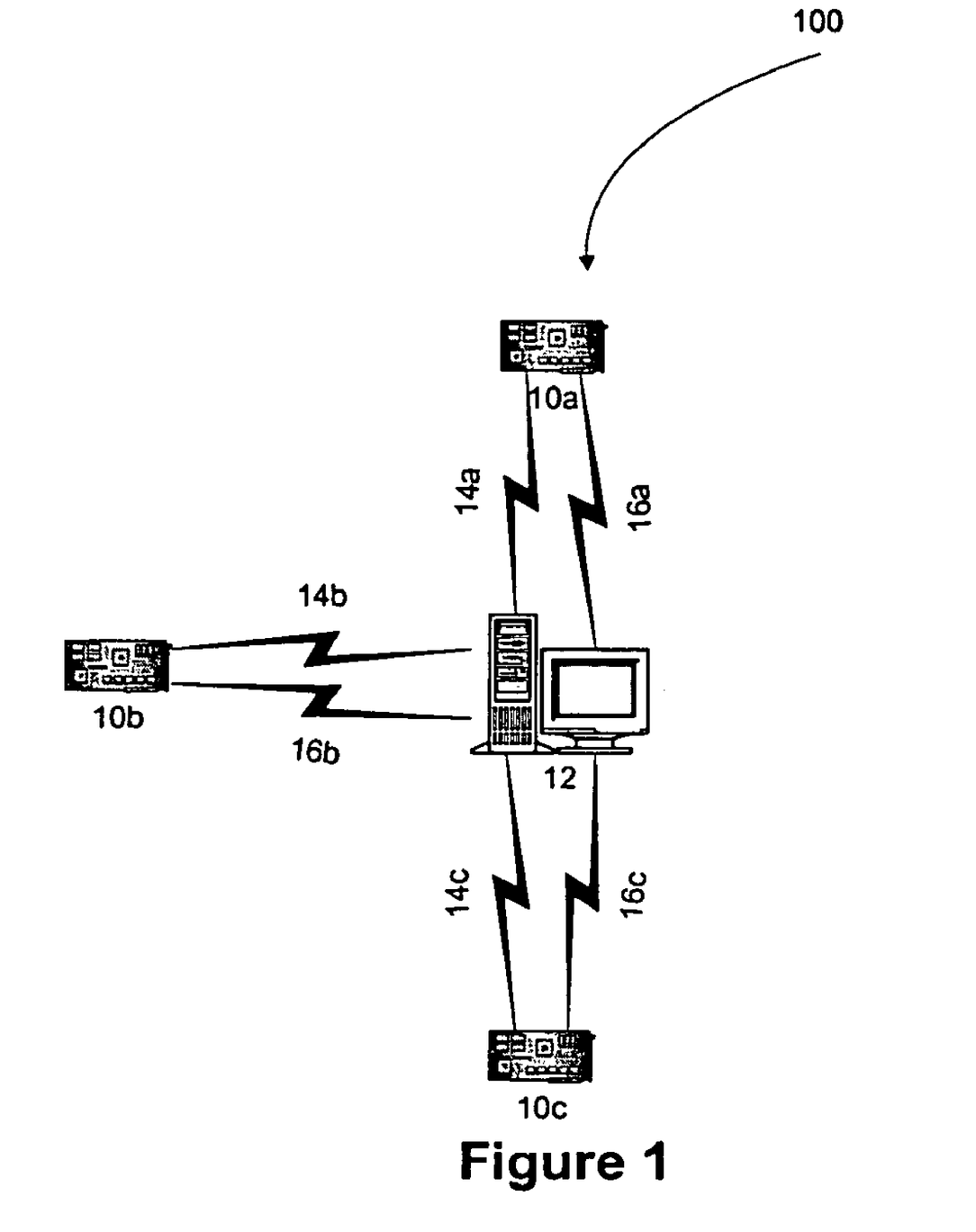
FIG. 1 is a diagram illustrating an example embodiment of a two-way wireless communications system in accordance with one embodiment of the invention.

FIG. 1 is a diagram illustrating an example embodiment of a two-way wireless communications system 100 configured in accordance with one embodiment of the systems and methods described herein. In system 100, one or more client devices, of which client devices 10a, 10b, and 10c are shown for purposes of illustration, are connected to a central authority 12. Each client device 10a, 10b, and 10c, and central authority 12 can communicate both over a circuit switched data links 14a, 14b, and 14c, respectively, and a packet switched data links 16a, 16b, and 16c, respectively.

In the example embodiment of FIG. 1, client devices 10a, 10b, and 10c can be fixed or mobile devices for gathering information. For example, client devices 10a, 10b, and 10c can be a fixed metering devices that report gathered data back to central authority 12, or they can be logging devices, e.g. used by a delivery person to record details of a delivery and relay details back to central authority 12. Circuit switched data links 14a, 14b, and 14c can be configured to support some sort of messaging standard, for instance the SMS standard. Packet switched data network links 16a, 16b, and 16c can be configured to implement any number of data transmission standards, for instance the IP standard. Central authority 12 can be any authority, which can track potentially a plurality of client devices.

The term "authority" used to identify central authority 12 is intended to indicate that client devices 10a, 10b, and 10c communicate with central authority 12 through the computing systems, hardware and software, associated with central authority 12. Thus, depending on the embodiment the term authority can refer to one or more servers, such as Internet or web servers, file servers, and/or database servers, one or more routers, one or more databases, one or more software applications, one or more Application Program Interfaces (APIs), or some combination thereof. Further, the computing system associated with central authority 12 can include one or more computers or computer terminals. Exemplary embodiments of various aspects included in a central authority 12 are described in more detail with respect to FIGS. 3 and 8.

Figure 2:
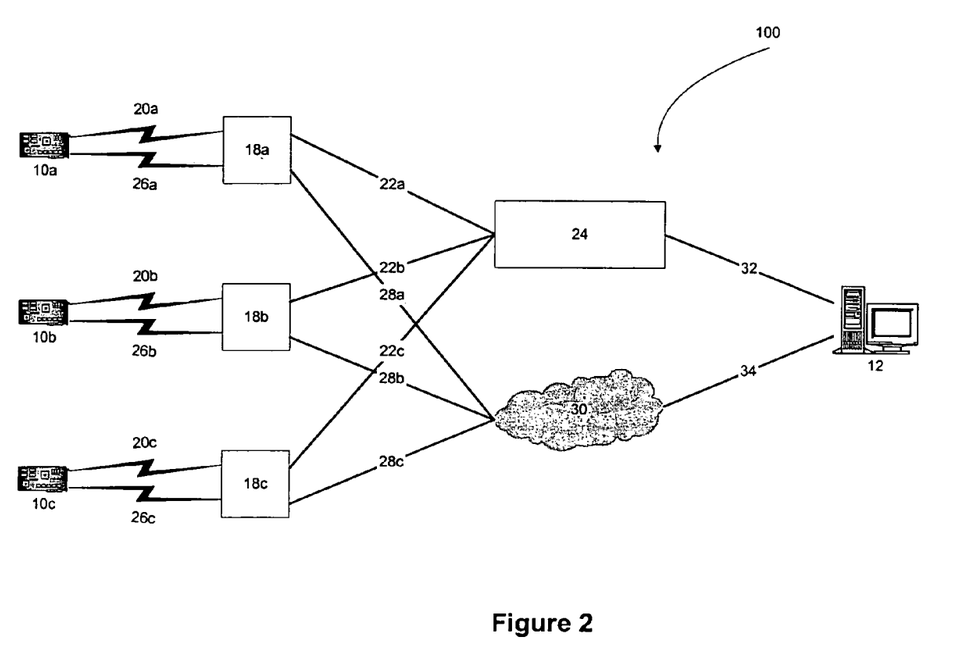
FIG. 2 is a diagram illustrating a more detailed embodiment of the system of FIG. 1 in accordance with one embodiment of the invention.

FIG. 2 is a diagram illustrating an exemplary wireless two-way communication system 100 in more detail. As illustrated, each client device 10a, 10b, and 10c can be connected to a base station 18a, 18b, and 18c through a circuit switched data link 20a, 20b, and 20c, respectively. Each base station 18a, 18b, and 18c can, in turn, be connected via a phone line 22a, 22b, and 22c, respectively, to a central office 24. In addition, each client device 10a, 10b, and 10c can also be connected to its corresponding base station 18a, 18b, and 18c through a packet switched data link, 26a, 26b, and 26c, respectively, and each base station 18a, 18b, and 18c can be connected via a data link 28a, 28b, and 28c to a public data network 30, such as the Internet. Base stations 18a, 18b, and 18c are part of a wireless communications infrastructure. They serve to connect terrestrial communications systems with wireless devices, such as client devices 10a, 10b, and 10c.

In the embodiment illustrated in FIG. 2, central authority 12 is connected with central office 24 with a phone line 32 and to the public data network 30 through a data link 34.

In one embodiment, packet switched data links 26a, 26b, and 26c can be configured to implement any of a plurality of wireless communication standards, such as General Packet Radio Service (GPRS), Enhanced Data for GSM (Global System for Mobile Communication) Evolution (EDGE), 1x Evolution-Data Only (1xEV-DO), etc. Client devices 10a, 10b, and 10c can share the same base station if they reside in the same communications cell, implement the same communications standard, and subscribed to the same carrier. For example, if client devices 10a and 10b reside in the same cell, their corresponding base stations 18a and 18b can physically be the same base station. Alternatively, base stations 18a and 18b can be distinct base stations as illustrated, if client devices 10a and 10b are not operating within the same cell, do not implement the same communication standard, and/or do not subscribe to the same carrier.

Phone line 22 can be a standard terrestrial phone line. Further, central office 24 can be extended to include a plurality of central offices 24 and the plurality of connections that may exist between them. For example, if the system in question spans multiple geographic regions, it can comprise multiple central offices 24 connected by trunk connections.

Base stations 18a, 18b, and 18c also serve as gateways to a public network 30. The data links 28a, 28b, and 28c connecting base stations 18a, 18b, and 18c to public network 30 use a data communication protocol, such as IP. Data links 28a, 28b, and 28c can included private data networks, routers, and other networking infrastructure that may lie between base stations 18a, 18b, and 18c and a public network gateway to public network 30.

In the embodiment illustrated in FIG. 2, central authority 12 is connected via a phone line 32 and via a data link 34, with central office 24 and public network 30, respectively. Phone line 32 can comprise a terrestrial phone line to central office 24, but it can also comprise a wireless phone line passing through a base station to a terrestrial phone line and then to central office 24. Likewise, data link 34 can comprise a terrestrial data communications connection passing through some private data networks, routers, or other network infrastructure to a public network 30 or it can comprise a wireless data connection passing though a base station and then through the terrestrial data communications connection as described before.

Thus, circuit switched data links 14a, 14b, and 14c described in FIG. 1 can be implemented as a series of links as described in FIG. 2. For instance, link 14a logically is a circuit switched data link between client device 10a and central authority 12. It can be physically implemented as a wireless link 20a to base station 18a, a phone line 22 to central office 24, and a phone line 32 to central authority 12.

Similarly, packet switched data links 16a, 16b, and 16c described in FIG. 1 can be realized as a series of links as described in FIG. 2. For instance, link 16a logically is a packet switched data link between client device 10a and central authority 12. It can be physically implemented as a wireless link 26a to base station 18a, a data link 28a to public data network 30, and another data link 34 to central authority 12.

In certain types of systems, such as telemetry systems, it is preferable for client devices 10a, 10b, and 10c to use the packet switched data links 16a, 16b, and 16c, respectively, to communicate information to central authority 12. For example, in a telemetry system, client devices 10a, 10b, and 10c will often be idle for a significant period of time, but then need to send a burst of data to central authority 12. Further, the information sent usually does not comprise real-time, or otherwise time sensitive, data. Thus, in a telemetry system, communication from client devices 10a, 10b, and 10c to central authority 12 is more suited for packet switched data communications than for circuit switched data communications.

Accordingly, a telemetry system, for example, can be configured to use packet switched data links 16a, 16b, and 16c both for communications from client devices 10a, 10b, and 10c to central authority 12 as well as for communications from central authority 12 to client devices 10a, 10b, and 10c. If, however, system 100 assigns packet data network address dynamically, then central authority 12 will not always know the packet data network address for a particular client device. A central authority 12 configured in accordance with the systems and methods described herein, however, can be configured to use circuit switched data links 14a, 14b, and/or 14c to acquire the packet data network address for a particular client device.

For example, if client device 10a, 10b, and 10c, are configured to communicate via a wireless communication network that includes both circuit switched and packet switched data capability, then central authority 12 can be configured to use the circuit switched data capability to send a circuit switched message to client device 10a, for example, requesting that device 10a register with central authority 12 and provide its packet data network address. In one embodiment, for example, central authority 12 can be configured to send an SMS message to client device 10a, e.g., using a mobile identification number (MIN) associated with client device 10a. The SMS message can request that client device 10a register with central authority 12 through the packet data portion of the network using the packet data network address of central authority 12. When client device 10a registers with central authority 12, it can then provide its packet data network address. If, for some reason, central authority 12 loses contact with client device 10a through the packet data network, then it can again send an SMS message and request that client device 10a re-register.

Accordingly, the systems and methods described herein provide a mechanism whereby central authority can maintain packet data communication capabilities with client devices 10a, 10b, and 10c in an environment where packet data network addresses are dynamically assigned. Several trigger mechanisms can be used to trigger the circuit switched registration request message. For example, central authority 12 can be configured to send the registration request message whenever it fails to receive a response to a packet data message. Central authority 12 can also be configured to periodically, or aperiodically, attempt to communicate with each client device through the packet data portion of the network, and then send a registration request message to any client devices with which communication fails. Alternatively, central authority 12 can, for example, be configured to just send a registration request message to each client device periodically, or aperiodically, without first attempting to communicate with the client devices.

Figure 3:
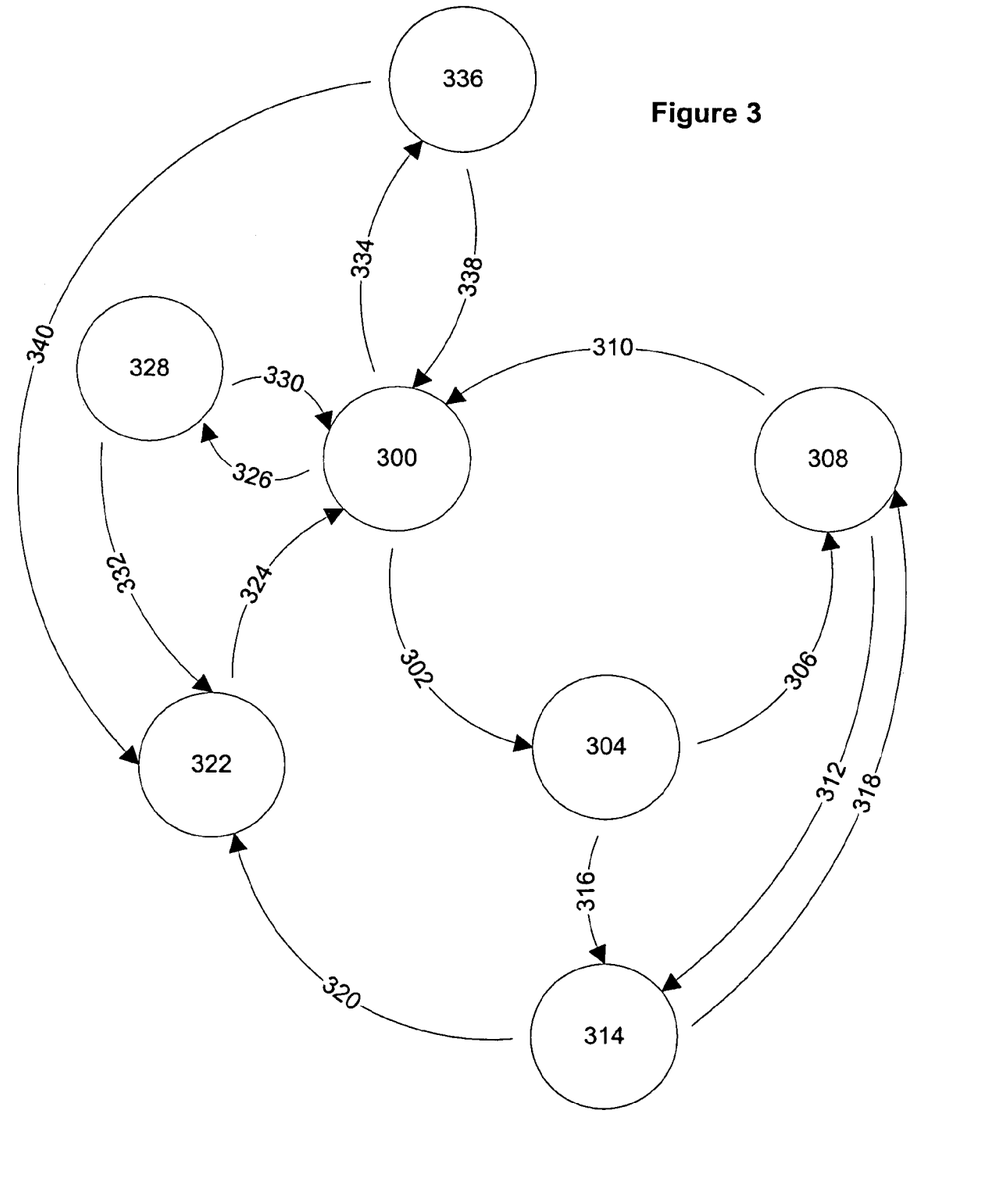
FIG. 3 is a state transition diagram illustrating the operation of a central authority included in the system of FIG. 1.

FIG. 3 illustrates a high-level state diagram of the operation of central authority 12 in accordance with one embodiment of the systems and methods described herein. For purposes of illustration, it is assumed hat the packet data network address is an IP address. In state 300, central authority 12 waits for activity. If central authority 12 needs to transmit a message to a client device, such as client device 10a, then central authority 12 transitions to state 304 via transition 302. While in state 304, central authority 12 can be configured to try and retrieve the IP address of client device 10a. If successful, central authority 12 can be configured to then transition to state 308 via transition 306. In state 308, a transmission of the message is attempted. If the transmission is successful, then central authority 12 can be configured to transition back to state 300 via transition 310. If the transmission fails, then central authority 12 can be configured to transition to state 314 via transition 312. If, while in state 304, central authority 12 can not retrieve the IP address of client device 10a, because, e.g., the client device 10a is new, has been removed, or lost communication previously, then central authority 12 can be configured to transition to state 314 via transition 316.

In state 314, central authority 12 can be configured to attempt to acquire the IP address of client device 10a using the protocol described below, i.e., using circuit switched data link 14a. If it is successful, central authority 12 can be configured to transition to state 308 via transition 318 where it can be configured to transmit the message. If the acquisition fails, because, e.g., the client device 10a fails to respond or fails to authenticate, then central authority 12 can be configured to transition to state 322 via transition 320. In state 322, central authority 12 can be configured to adjust its records of client devices and their IP address to account for the unavailability of client device 10a and transition back to state 300 via transition 324.

While in state 300, central authority 12 can receive a notification of change in IP address. When this occurs, central authority 12 transitions to state 328 via transition 326 where it attempts to acquire the new IP address of a client device 10a. If the acquisition fails, central authority 12 transitions to state 322 via transition 332 to process the failure, otherwise, central authority 12 returns to state 300 via transition 330 after recording the new IP address. In state 300, transition 326 can also be triggered by a previously idle client device 10a transitioning to a powered up state.

While in state 300, central authority 12 can receive a notification of impending shutdown by a client device 10a. When this occurs, central authority 12 transitions to state 336 via transition 334. If the determination of shutdown fails, central authority 12 transitions to state 322 via transition 340 to process the failure, otherwise, central authority 12 returns to state 300 via transition 338 after marking client device 10a as no longer available.

In state 314, central authority 12 needs to acquire the IP address of a client device 10a. To do this, central authority 12 transmits a request to client device 10a, over the circuit switched link 14a using a messaging standard. This request is addressed using the client device's circuit switched address, which in this example is its MIN. All subsequent communication between client device 10a and central authority 12 can take place over packet switched data link 16 until such time as client device's 10a current IP address becomes invalid, client device 10a becomes inactive, or central authority 12 loses track of client device's 10a IP address.

Thus, in state 300, central authority 12 waits. In state 304, central authority 12 prepares to transmit a message to a client device 10a by retrieving its IP address. In state 308, central authority 12 transmits the requested message to client device 10a. In state 314, central authority 12 attempts to force client device 10a to register. If successful, a new IP address is recorded in associative storage 806 illustrated in FIG. 8 for client device 10a. State 322 is a registration failure state and the client device's IP address is removed from the associative storage 806. In state 328, central authority 12 participates in a re-registration procedure with client device 10a. If successful, a new IP address replaces the record in associative storage 806 for client device 10a. In state 336, central authority 12 participates in a shutdown protocol with client device 10a. If successful, then client device 10a is marked as idle and the IP address is removed from associative storage 806 record for client device 10a.

Transition 302 represents a request to transmit a message to a client device 10a. Transition 306 represents successful retrieval of the IP address of client device 10a. Transition 310 represents a return to waiting upon successful transmission of the message. Transition 312 represents a failure of transmissions of the message. Transition 316 represents a failure to retrieve the IP address of client device 10a. Transition 318 represents successful registration. Transition 320 represents failed registration. Transition 324 represents a return to waiting upon processing the registration failure. Transition 326 represents receiving a re-registration request from a client device 10a. Transition 330 represents successful re-registration. Transition 332 represents failed re-registration. Transition 334 represents receiving a power-down notification from a client device 10a. Transition 338 represents successful power-down registration. Transition 340 represent failed power-down registration.

Figure 4:
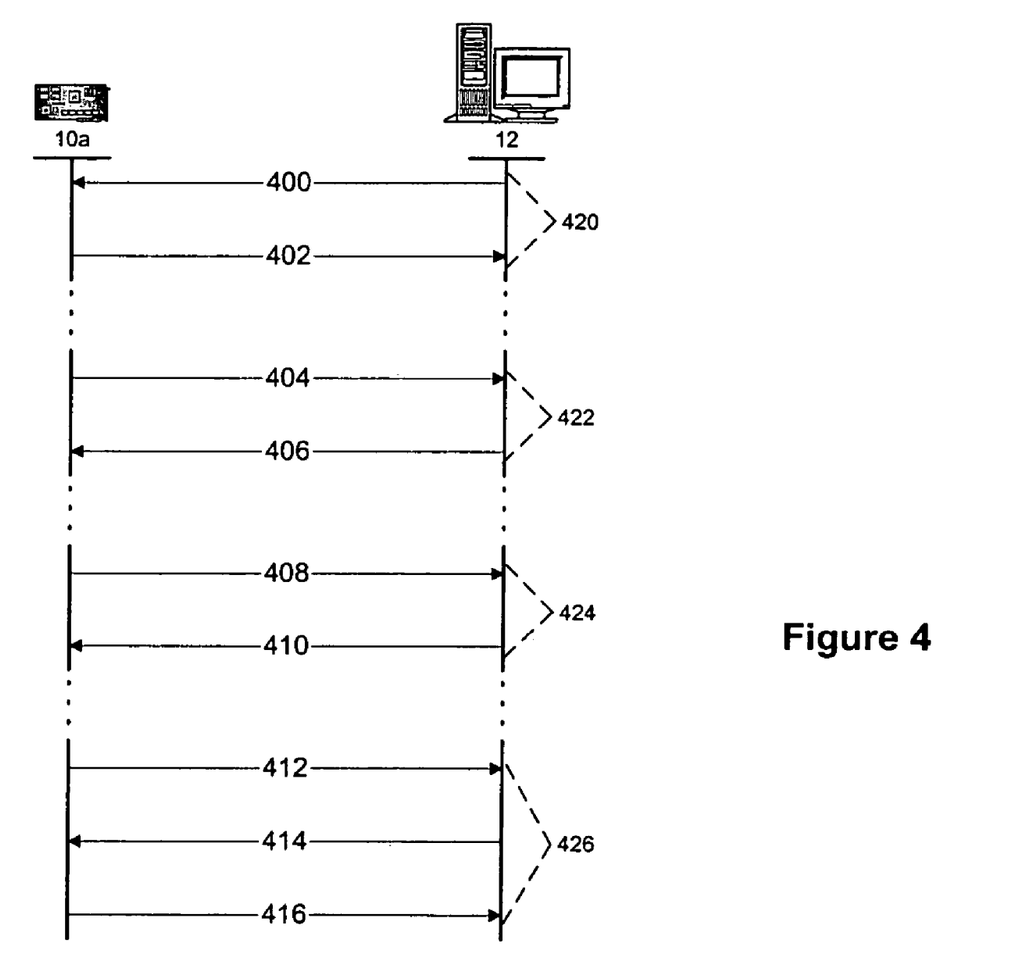
FIG. 4 is a message protocol diagram illustrating communications protocols used in accordance with one embodiment of the invention.

FIG. 4 is a message protocol diagram illustrating communications protocols used in accordance with one embodiment of the systems and methods described herein. Protocol 400 is used when central authority 12 attempts to acquire the packet data network address of, e.g., client device 10a. Thus, a request message 400 is sent to client device 10a over circuit switched link 14a using a messaging channel such as an SMS messaging channel. The request message can comprises the packet data network address of central authority 12. Alternatively, client device 10a may already posses the packet data network address of central authority 12. In such instances, it is unnecessary to include the packet data network address associated with central authority 12 in the request message. A response 402 can then be sent from client device 10a to central authority 12 over packet switched data link 16a. The response preferably comprises the packet data network address of client device 10a.

Protocol 422 depicts a notification protocol, which can be used whenever client device 10a is informed that it has acquired a new packet data network address. For example, if client device 10a is moved from one zone of service to another, the associated network or networks can assign a new packet data network address when client device 10a transitions between zones. Alternatively, upon expiration of a client device's DHCP lease, a new packet data network address can be issued if client device 10a initiates a DHCP renewal. In such instances, a message 404 can be sent from client device 10a to central authority 12 over packet switched data link 16a. The message can comprise the new packet data network address of client device 10a. Central authority 12 can be configured to then reregister the new packet data network address of client device 10a. In another embodiment' an acknowledgement response 406 is returned from central authority 12 to client device 10a over packet switched data link 16a.

Protocol 424 depicts a shutdown notification protocol, which can occur during a power-down sequence executed by client device 10a. In such situations, a message 408 can be sent from client device 10a to central authority 12 over packet switched data link 16a. In another embodiment, an acknowledgement response 410 can be returned from central authority 12 to client device 10a over packet switched data link 16a. Client device 10a can optionally be configured to wait for the acknowledgement before completing its power-down.

In another embodiment, if a previously registered client device 10a has been registered, it can retain the packet data network address of central authority 12 in some form of non-volatile memory. If such is the case, then upon power-up client device 10a can transmit messages to central authority 12 and use protocol 422 to re-register client device 10a with central authority 12.

Since transports such as SMS and TCP/IP are not secure, additional measures can be taken to protect the integrity of the process from eavesdropping and spoofing. For example, a shared secret between client device 10a and central authority 12 can be implemented to enhance security. The shared secret can be a number of predetermined length that is assigned to client device 10a, either in the factory or by service personnel, and registered with central authority 12. One embodiment incorporates the shared secret in all messages as a signature to authenticate client device 10a, central authority 12, or both. Additional factors can be included in response 402, message 404, and message 408 to further aid in authenticating client device 10a. In certain embodiments, the shared secret can also be used as a key or component of a key to encrypt the messages.

Further, in certain embodiments, a transient factor such as a random or pseudorandom number can be incorporated in message 400 to further secure the protocol. In such an embodiment, when a registered client device 10a powers up, the transient information can be invalid and any subsequent re-registration with protocol 422 may fail. However, protocol 426 can be used in this embodiment to re-register client device 10a during power-up.

In protocol 426, message 412 is transmitted from client device 10a to central authority 12 over packet switched data link 16a. Message 412 can comprise the packet data network address of client device 10a. In response, central authority 12 can send a message 414 from central authority 12 to client device 10a over packet switched data link 16a. Message 414 can comprise the authentication factors, such as the shared secret, and can be encrypted using the shared secret. Message 414 can further comprise a random number required by client device 10a to properly sign response message 416. Message 416 can then be sent from client device 10a to e central authority 12 over packet switched data link 16 in response to message 414. Message 416 can comprise authentication factors for client device 10a and can be encrypted by the shared secret. It can further comprise the random number to provide a session signature to the message.

Figure 5A:
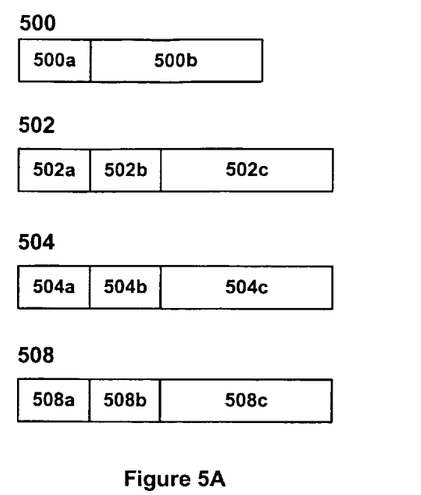
FIG. 5A is a message format diagram illustrating the message format used in the communications protocols of FIG. 4.

FIG. 5A is a message format diagram illustrating the message format used in the communications protocols of FIG. 4. Message 500 is an exemplary embodiment of message 400 transmitted from central authority 12 to client device 10a using a message service such as SMS to request registration and can comprise a message code 500a and a packet data network address 500b of central authority 12. Message 502 is an exemplary embodiment of message 402 transmitted from client device 10a to central authority 12 over packet switched data link 16a and can comprise a message code 502a, a MIN 502b of client device 10a, and a packet data-network address 502c of client device 10a.

Message 504 is an exemplary embodiment of message 404 transmitted from client device 10a to central authority 12 over packet switched data link 16*a* and can comprise a message code 504*a*, a MIN 504*b* of client device 10*a*, and the current packet data network address 504*c* of client device 10*a*. Message 508 is an exemplary embodiment of message 408 transmitted from client device 10*a* to central authority 12 over packet switched data link 16*a* and can comprise a message code 508*a* and MIN 508*b* of client device 10*a*.

Message codes 500*a*, 502*a*, 504*a* and 508*a* are used to identify each individual message type. For instance, all registration request messages 500 can be assigned the same predetermined message code. Similarly, all registration response messages 502 can be assigned the same predetermined message code, but one that is distinct from 500*a*. Likewise, messages 504*a* and 508*a* can be assigned the same predetermined message code, but ones that are distinct from each other and from the ones assigned to messages 500*a* and 502*a*.

MIN fields 502*b*, 504*b* and 508*b* are used to identify or confirm which client device 10*a* is being contacted. This can address potential confusion that can occur when more than one client device is concurrently interacting with central authority 12. Packet data network address field 502*c* can be used to inform client device 10*a* of the packet data network address of central authority 12. Packet data network address field 504*c* can be used to inform central authority 12 of the current packet data network address of client device 10*a*, e.g., after any potential change of packet data network addresses.

Figure 5B:
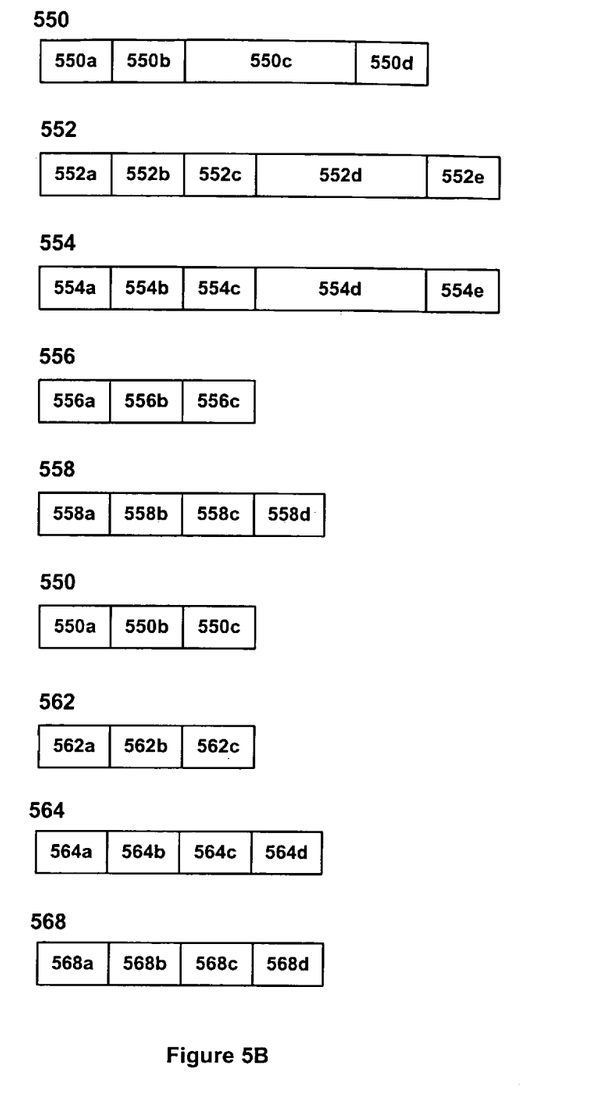
FIG. 5B is a message format diagram illustrating the message format used in the communications protocols used in accordance with a security-enhanced embodiment of the invention.

FIG. 5B is a message format diagram illustrating the message format used in the communications protocols used in accordance with a security-enhanced embodiment of the systems and methods described herein. Thus, message 550 is an exemplary embodiment of message 400 transmitted from central authority 12 to client device 10*a* using a message service such as SMS to request registration and can comprise a protocol tag 550*a*, a message code 550*b*, a packet data network address 550*c* of central authority 12, a random or pseudorandom number 550*d*, and an authentication signature 550*e*. Message 552 is an exemplary embodiment of message 402 transmitted from client device 10*a* to central authority 12 over packet switched data link 16*a* and can comprise a protocol tag 552*a*, a message code 552*b*, a MIN 452*c* of client device 10*a*, a packet data network address 552*d* of client device 10*a*, and an authentication signature 552*e*. Message 554 is an exemplary embodiment of message 404 transmitted from client device 10*a* to central authority 12 over packet switched data link 16*a* and can comprise a protocol tag 554*a*, a message code 554*b*, a MIN 554*c* of client device 10*a*, a current packet data network address 554*d* of client device 10*a*, and an authentication signature 554*e*.

Message 556 is an exemplary embodiment of message 406 transmitted from central authority 12 to client device 10*a* over packet switched data link 16*a* and can comprise a protocol tag 556*a*, a message code 556*b*, and a MIN 556*c* of client device 10*a*. Message 558 is an exemplary embodiment of message 408 transmitted from client device 10*a* to central authority 12 over packet switched data link 16*a* and can comprise a protocol tag 558*a*, a message code 558*b*, MIN 558*c* of client device 10*a*, and an authentication signature 558*d*. Message 560 is an exemplary embodiment of message 410 transmitted from central authority 12 to client device 10*a* over packet switched data link 16*a* and can comprise a protocol tag 560*a*, a message code 560*b*, and MIN 560*c* of client device 10*a*. Message 562 is an exemplary embodiment of message 412 transmitted from client device 10*a* to central authority 12 over packet switched data link 16*a* and can comprise a protocol tag 562*a*, a message code 562*b*, and MIN 562*c* of client device 10*a*. Message 564 is an exemplary embodiment of message 414 transmitted from central authority 12 to client device 10*a* over packet switched data link 16*a*, and can comprise a protocol tag 564*a*, a message code 564*b*, a MIN 564*c* of the client device 10*a*, a random or pseudorandom number 564*d*, and an authentication signature 564*e*. Message 568 is an exemplary embodiment of message 416 transmitted from client device 10*a* to central authority 12 over packet switched data link 16*a* and can comprise a protocol tag 568*a*, a message code 568*b*, a MIN 568*c* of the client device 10*a*, and an authentication signature 568*d*.

Protocol tags 550*a*, 552*a*, 554*a*, 556*a*, 558*a*, 560*a*, 562*a*, 564*a*, and 568*a* are used to distinguish messages used in this protocol. The tags can be any predetermined, fixed-length string of data and can, depending on the embodiment, be the same string of data for all messages. The tags are useful, for example, if other message protocols are transmitted over the same connection. Message codes 550*b*, 552*b*, 554*b*, 556*b*, 558*b*, 560*b*, 562*b*, 564*b*, and 568*b* can be used to identify each individual message type. For instance, all registration request messages 550 can be assigned the same predetermined message code. Similarly, all registration response messages 552 can be assigned the same predetermined message code, but one that is distinct from 550*b*. Likewise, 554*b*, 556*b*, 558*b*, 560*b*, 562*b*, 564*b*, and 568*b* can be assigned the same predetermined message code, but ones that are distinct from each other and from 550*b* and 552*b*.

MIN fields 552*c*, 554*c*, 556*c*, 558*c*, 560*c*, 562*c*, 564*c*, and 568*c* can be used to identify or confirm which client device is being contacted, which can address potential confusion that can occur when more than one client device is concurrently interacting with central authority 12.

Packet data network address field 502*c* can be used to inform client device 10*a* of the packet data network address of central authority 12. Packet data network address field of 504*c* can, in turn, be used to inform central authority 12 of the current packet data network address of client device 10*a*.

Random or pseudorandom numbers 550*d* and 564*d* can be numbers of predetermined length generated by, for example, random or pseudorandom number generator 408, while authentication signatures 550*e* can be comprise a number of predetermined length derived in a predetermined procedure from a plurality of factors, such as the ESN of client device 10*a*, the MIN of client device 10*a*, a secret number of predetermined length shared between client device 10*a* and central authority 12, and the random or pseudorandom number 550*d*. The predetermined procedure, just referred to, can be a hash function, which cryptographically reduces the ESN, the MIN, the shared secret, the random or pseudorandom number, or some combination thereof into a number of predetermined length. Such a signature can only be derived by a party in possession of the shared secret, such as central authority 12 or client device 10*a*. The random or pseudorandom number ensures that each signature is distinct for each transaction. Therefore, central authority 12 can be authenticated.

Authentication signature 552*e* can be a number of predetermined length derived using a predetermined procedure from a plurality of factors such as the ESN, of client device 10*a*, the MIN of client device 10*a*, a secret number of predetermined length shared between client device 10*a* and central authority 12, and the random or pseudorandom number received in message 550, e.g., in field 550*d*.

Similarly, authentication signature 554*e* and/or authentication signature 558*e* can also each be of predetermined length, although not necessarily the same length, derived in a predetermined procedure from a plurality of factors. Again, these factors can include the ESN of client device 10*a*, the MIN of client device 10*a*, a secret number of predetermined length shared between client device 10a and central authority 12, and the random or pseudorandom number received in message 550, e.g., in field 550d at the time of the last registration. Authentication signature 564e can also be a number of predetermined length derived in a predetermined procedure from a plurality of factors that also include the ESN of client device 10a, the MIN of client device 10a, a secret number of predetermined length shared between client device 10a and central authority 12, and the random or pseudorandom number received in message 564d as opposed to message 550d.

Authentication signature 568d can also be a number of predetermined length derived in a predetermined procedure from a plurality of factors again include the ESN of client device 10a, the MIN of client device 10a, a secret number of predetermined length shared between client device 10a and central authority 12, and the random or pseudorandom number received in message 564, e.g., in field 564d at the time of the last registration. Authentication signature can then be used to authenticate client device 10a. In certain embodiments, field 550c can comprise the packet data address of central authority 12 and field 552d can comprise the packet data address of client device 10a at the time of registration. Field 554d can, depending on the embodiment, comprise the new packet data address of client device 10a at the time of re-registration. The identity of client device 10a can be conformed by validating, at central authority 12, authentication signatures 552e, 554e, 558e, 564e and 568d. Similarly, the validation of authentication signature 550e at client device 10a can be used to confirm the identity of central authority 12.

Figure 6:
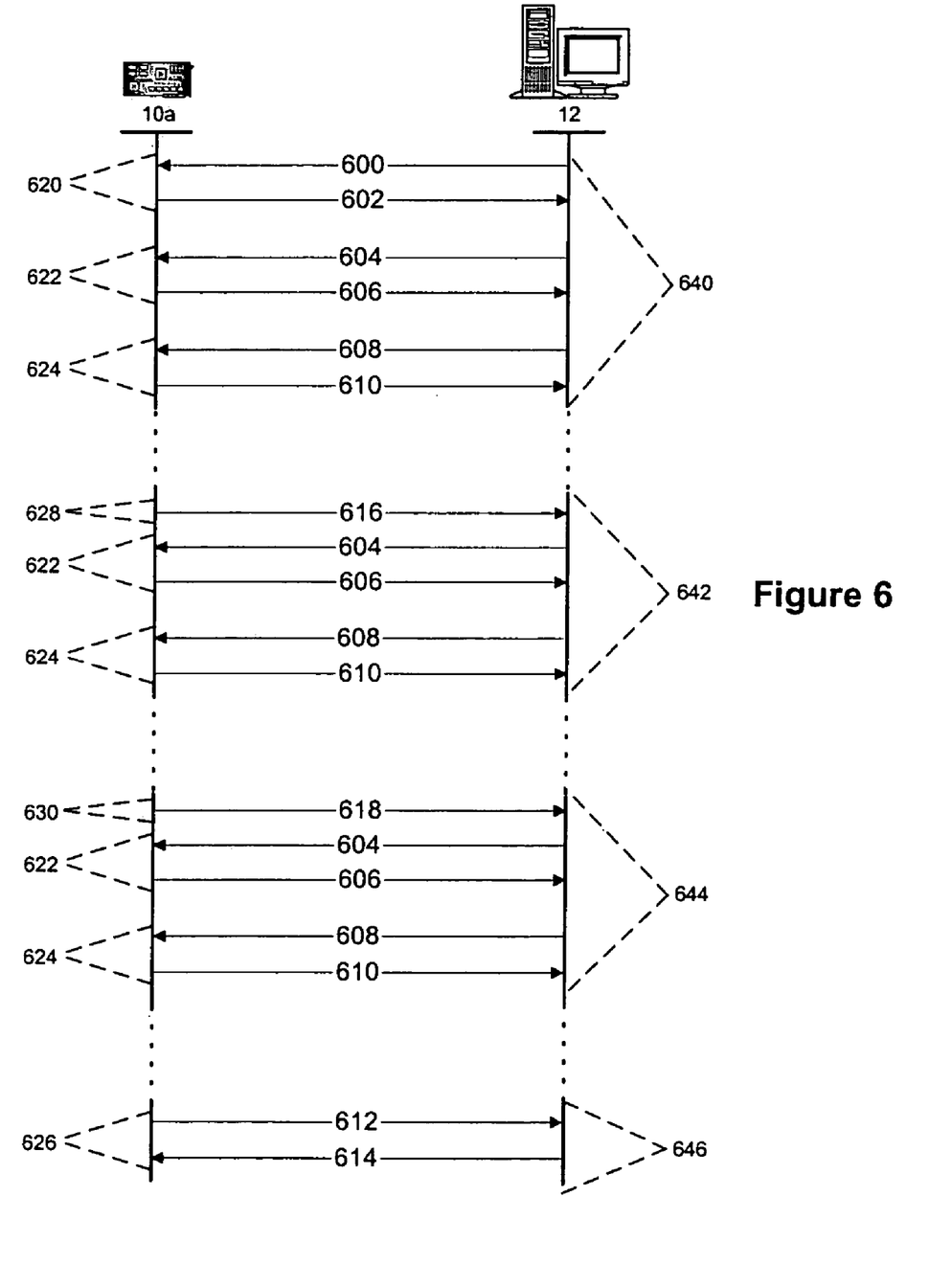
FIG. 6 is a message protocol diagram illustrating communications protocols used in accordance with another embodiment of the invention.

FIG. 6 is a message protocol diagram illustrating a more elaborate embodiment of the communications protocol that can be used for communication between central authority 12 and, e.g., client device 10a. In this embodiment, the protocols are more modular and robust than in the other embodiments described thus far. Each protocol can be divided into phases. First, discovery phase 620 can comprise messages 600 and 602. Discovery phase 600 can serve to notify client device 10a that a registration is requested. Next, registration phase 622 can follow and comprise messages 604 and 606. Registration phase 622 can be implemented in order to convey the packet data network address of client device 10a to central authority 12. In addition, registration phase 622 can also be used to authenticate client device 10a and central authority 12. Next, authentication phase 624 can comprise messages 608 and 610 and be implemented to authenticate the identity of central authority 12. Challenge phase 626 can follow and can comprise messages 612 and 614. Challenge phase 626 can be used to challenge central authority 12 in order to authenticate its identity to client device 10a. Notification phase 628 can then comprise message 616, which can inform central authority 12 that client device 10a has changed packet data network addresses. Shutdown phase 630 can comprise message 618, which can inform central authority 12 that client device 10a is about to power-down.

Registration protocol 640 can comprise a discovery phase 620 and a registration phase 622. In a more secure embodiment, registration protocol 640 can further comprise an authentication phase 624. Re-registration protocol 642 can comprise a notification phase 628 and a registration phase 622. In another embodiment, the re-registration protocol 642 can further comprise an authentication phase 624. Power-down protocol 644 can comprise the shutdown phase 630. In still another embodiment, power-down protocol 644 can further comprise authentication phase 624. In one embodiment, client device 10a can comprise a random or pseudorandom number generator 808 (see FIG. 8), which can be configured to enable the implementation of a challenge protocol 646, which can comprise the challenge phase 626.

Figure 7A:
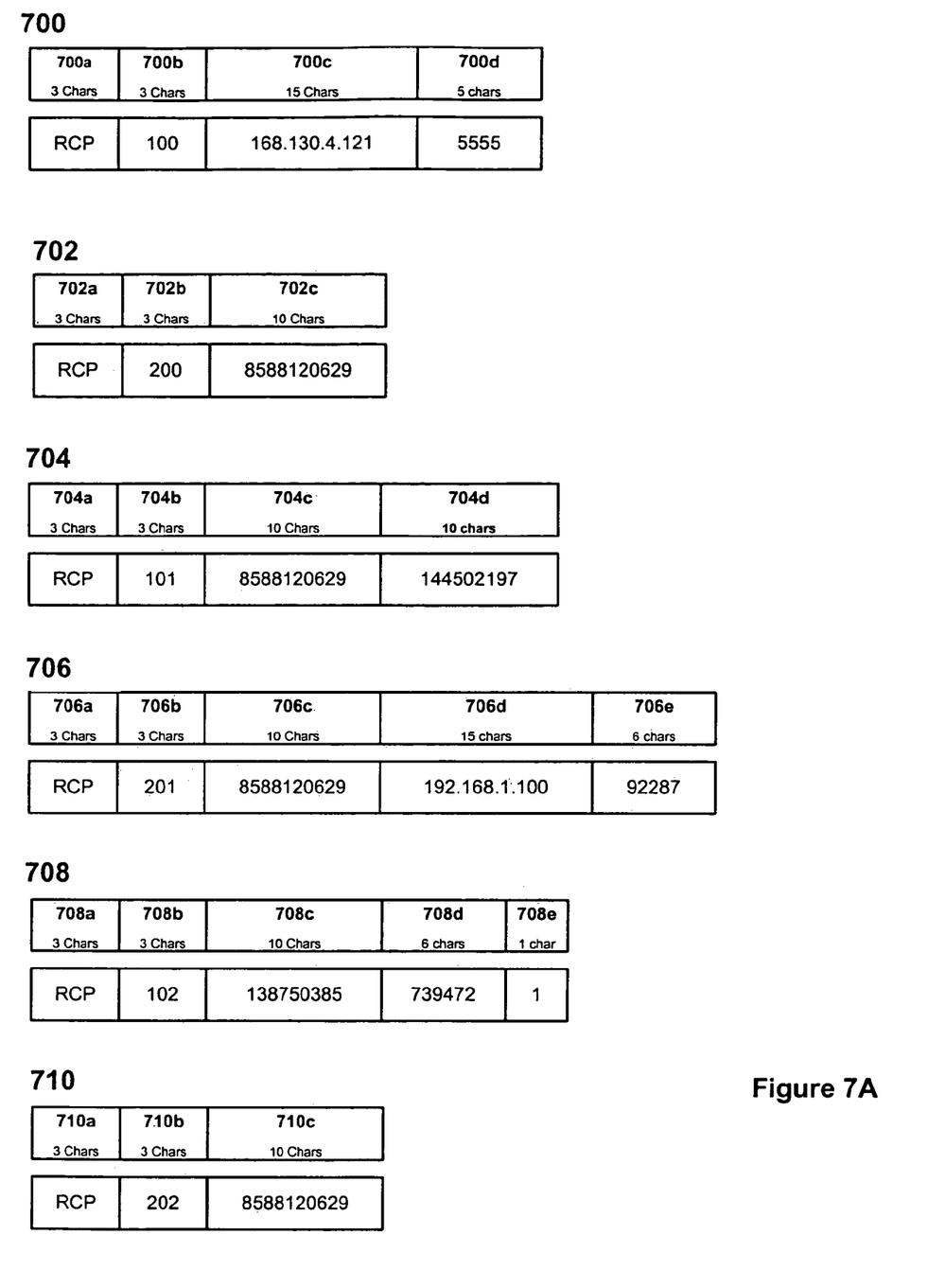
FIGS. 7A and 7B are message format diagrams illustrating the message format used in the communications protocols of FIG. 6.
Figure 7B:
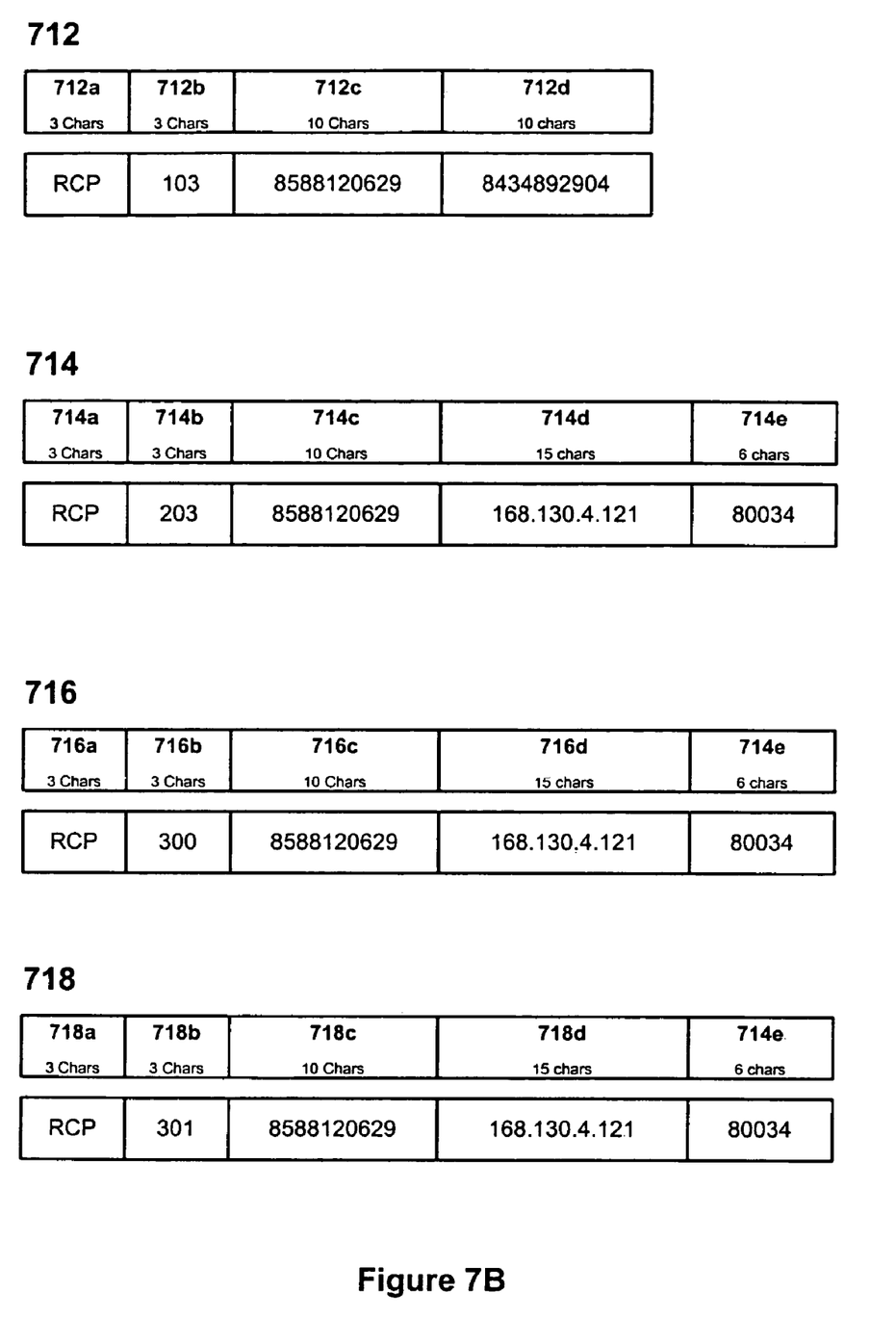

FIGS. 7A and 7B are message format diagrams illustrating the message format used in the communications protocols of FIG. 6. Thus, message 700 is transmitted from central authority 12 to client device 10a using a message service such as SMS to request a registration of client device 10a. Message 700 can, in certain embodiments, comprise a protocol tag 700a and a message code 700b to identify the message. Message 700 can further comprise the central authority's packet data network address 700c and a desired port number 700d for return communications. Messages 702, 704, 706, 708, 710, 712, 714, 716, and 718 are all transmitted using a packet data network using a packet data protocol, such as the IP.

Message 702 can then be a response to message 700 and, therefore, can be transmitted from client device 10a to central authority 12. It can comprise a protocol tag 702a, a message code 702b, and a MIN 702c associated with client device 10a.

Message 704 can be transmitted from central authority 12 to client device 10a and can comprise a protocol tag 704a, a message code 704b, a MIN 704c associated with client device 10a, and a random or pseudorandom 704d. Message 706 can then be sent as a response to message 70, transmitted from client device 10a to central authority 12. Message 706 can comprise a protocol tag 706a, a message code 706b, a packet data network address 706c associated with client device 10a, and an authentication signature 706d.

Message 708 can be transmitted from central authority 12 to client device 10a and can comprise a protocol tag 708a, a message code 708b, a random or pseudorandom number 708c, an authentication signature 708d, and a flag 708e. Message 710 can then be sent in response to message 708 and can comprise a protocol tag 710a, a message code 710b, and a MIN 710c associated with client device 10a.

Message 712 can be transmitted from client device 10a to central authority 12 and can comprises a protocol tag 712a, a message code 712b, a MIN associated with client device 10a, and a random or pseudorandom number 712c. Message 714 can then be transmitted in response to message 712 and, therefore, can be transmitted from central authority 12 to client device 10a. Message 714 can comprise a protocol tag 714a, a message code 714b, a packet data network address 714c of central authority 12, and an authentication signature 714d.

Message 716 can be an unsolicited message transmitted from client device 10a to central authority 12 and can comprises a protocol tag 716a, a message code 716b, and a MIN 716c associated with client device 10a. Message 718 can also be an unsolicited message transmitted from client device 10a to central authority 12 and can comprise a protocol tag 718a, a message code 718b, and a MIN 718c associated with client device 10a.

The protocol tags 700a, 702a, 704a, 706a, 708a, 710a, 712a, 714a, 716a, and 718a can be used to distinguish messages used in the protocol. For example, in one embodiment, the protocol tags are represented by the characters "RCP". Message codes 700b, 702b, 704b, 706b, 708b, 710b, 712b, 714b, 716b, and 718b are used to identify each individual message type. In one particular implementation, the above message codes can be fixed to the numbers 100, 200, 101, 201, 102, 202, 103, 203, 300, and 301, respectively, in a 3-character ASCII form.

Figure 8:
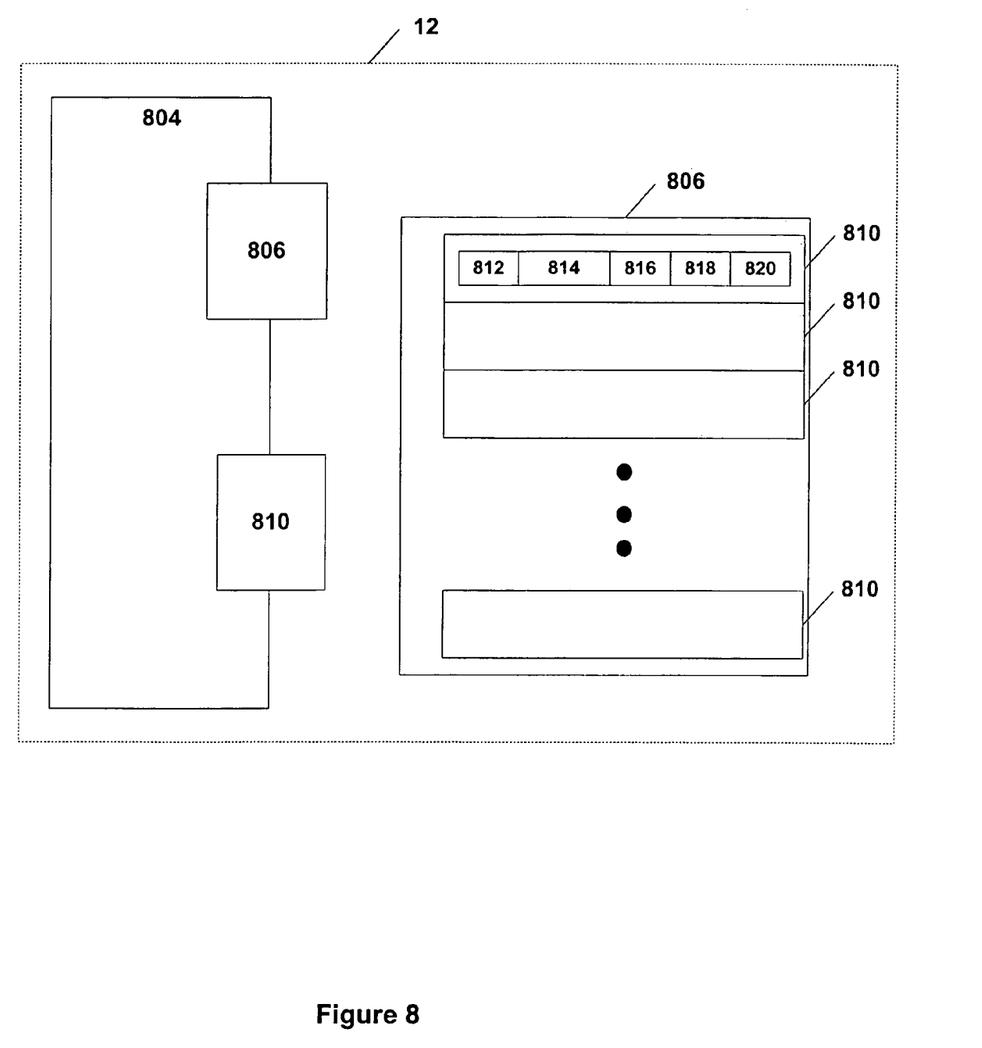
FIG. 8 is a diagram illustrating an exemplary embodiment of a central authority included in the system of FIG. 1.

Random or pseudorandom numbers 704d, and 708c can be 10 digit numbers generated by a random or pseudorandom number generator, e.g., generator 808 discussed below. These fields are represented in the message as a 10-digit ASCII number. MIN fields 702c, 706c, 710c, and 714c can be included in the responses discussed above and can be included to insure the correct client device received a given message. MINs are generally represented as a 10-digit phone number. Similarly, MIN field 704*c* can inform client device 10*a* that a received message was in fact intended for that device. In the event that a packet data network address change occurs before re-registration can take place, this field can ensure the integrity of the recipient.

Authentication signature 706*d* can be an 18-bit number, expressed as a 5-digit ASCII number, and can, for example, be derived from a plurality of factors including the ESN associated with client device 10*a*, the MIN associated with client device 10*a*, a 64-bit secret shared between client device 10*a* and central authority 12, and a random or pseudorandom number received, e.g., in field 704*d* of message 704. Authentication signature 706*d* can be used to validate the authenticity of client device 10*a*. Authentication signature 708*d* can also be an 18-bit number, expressed as a 5-digit ASCII number, and can also be derived from a plurality of factors including the ESN associated with client device 10*a*, the MIN associated with client device 10*a*, a 64-bit secret shared between client device 10*a* and central authority 12, and a random or pseudorandom number included in field 708*c* of the same message. Authentication signature 708*d* can, however, be used to validate the authenticity of central authority 12.

Flag 708*e* can be used to inform client device 10*a* as to whether client device 10*a* has been properly authenticated during the registration phase.

The preceding embodiment can be preferred over the protocol illustrated in FIG. 6B, because no random or pseudorandom number need to be stored by either the central authority 12 or the client device 10*a*. Security is improved since a new random or pseudorandom number is used for each signature.

In another embodiment, some or all of the fields of message 700, 702, 704, 706, 708, 710, and 714 can be encrypted using the 64-bit shared secret, for example, by using the shared secret as a key for DES. MIN fields, 712*c*, 716*c*, and 718*c*, however, are often not encrypted so that central authority 12 can retrieve the appropriate record from, e.g., associative storage 806. Encryption such as this further improves security by hindering eavesdropping.

FIG. 8 illustrates an example central authority 12 configured in accordance with one embodiment of the systems and methods described herein. Central authority 12 comprises a packet switched data network communications port 800 and a communications conduit 802 configured to interface central authority 12 with a messaging service over a circuit switched network. Central authority 12 further comprises a central processing unit (CPU) 804 and an associative storage 806, which in equivalent embodiments can lie inside or outside the CPU 804 and inside or outside central authority 12. Associative storage 806 further comprises a plurality of records 810 associated with each client device in system 100. Each record 810 comprises a circuit switched network address 812 for each client device, and an IP address 814 for each client device.

In another embodiment, each record 810 can further comprise a secret 816 shared with each client device and, depending on the embodiment, can further comprise additional authenticating factors 818, such as a serial number or Electronic Serial Number (ESN). In still another embodiment, central authority 12 can further comprise a random or pseudorandom number generator 808, which in equivalent embodiments can lie inside or outside the CPU 804. In such an embodiment, each record 810 can comprise a random number 820 issued to each client device when the device has been registered.

In one particular embodiment, packet switched data network communications port 800 is an IP port and communications conduit 802 can be directly connected to a circuit switched network via, e.g., a phone line or wireless phone network. In another embodiment, communications conduit 802 can be a data communications port connected to a messaging server, which facilitates the transmissions of messaging over the circuit switched network. For example, in one specific implementation, central authority 12 can connect through its communications conduit 802 to an SMS server, which can issue an SMS message to, e.g., client device 10*a*.

CPU 804 can be a computing device, a database server, or any other platform that can be configured to implement the functionality described herein. Associative storage 806 can be any storage medium for which a record can be associated with an object, for instance a formal database or an associative list stored in the CPU's memory. Random or pseudorandom number generator 808 can be any device or algorithm that can generate a difficult to predict sequence of numbers. These numbers can be random numbers or pseudorandom numbers. Circuit switched network address 812 in many embodiments is a MIN associated with each client device. IP address 814 is the IP address at the last registration for each client device. Shared secret 816 can be a random or pseudorandom number assigned to each client device either at the factory or by service personnel.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A communication system, comprising:
  a circuit switch data network;
  a packet switch data network configured to assign network addresses in a dynamic fashion;
  a client device configured to send and receive packet switched and circuit switched communications over the packet switched data network and the circuit switch data network, respectively; and
  a central authority configured to send a circuit switch message to the client device through the circuit switched data network requesting that the client device register with the central authority through the packet switch data network,
  wherein the client device is further configured to include a packet switched network address with a packet switched registration message sent to the central authority and to send a new packet switched registration message whenever the packet switched data network assigns the client device a new packet switched network address.

2. The communication system of claim 1, wherein the circuit switch message sent to the client device is a short message service message.

3. The communication system of claim 1, wherein the central authority is further configured to receive a packet switched registration message from the client device in response to the circuit switched message sent to the client device.

4. The communication system of claim 3, wherein the central authority is further configured to extract a packet data network address associated with the client device from the packet switch registration message received from the client device.

5. The communication system of claim 4, wherein the central authority comprises a data base configured to store information related to the client device, and wherein the central authority is configured to update the information stored in the data base based on information contained in the received packet switched registration message.

6. The communication system of claim 5, wherein the central authority is further configured to update the information stored in the data base based on the packet data network address extracted from the received packet switch registration message.

7. The communication system of claim 6, wherein the central authority is further configured to send a message to the client device using the packet data network address stored in the data base.

8. The communication system of claim 1, wherein the central authority is further configured to send the circuit switched message to the client device using a circuit switched network identifier associated with the client device.

9. The communication system of claim 8, wherein the circuit switched network identifier is a mobile identification number associated with the client device.

10. The communication system of claim 1, wherein the client device is further configured to receive the circuit switched message from the central authority and send a packet switched registration message through the packet switched data network to the central authority in response to the received circuit switched message.

11. The communication system of claim 1, further comprising a shared secret that is shared between the client device and the central authority, wherein the shared secret is used for authentication.

12. The communication system of claim 11, wherein the central authority is further configured to encrypt the circuit switched message sent to the client device using the shared secret.

13. The communication system of claim 1, wherein the central authority comprises a random or pseudo-random number generator, and wherein the circuit switched message sent to the client device includes a random or pseudo-random number generated by the random or pseudo-random number generator.

14. The communication system of claim 13, wherein the central authority is further configured to encrypt the circuit switched message sent to the client device using a random or pseudo-random number generated by the random or pseudo-random number generator.

15. The communication system of claim 1, wherein the client device is further configured to receive the circuit switched message sent by the central authority and to decrypt the circuit switched message.

16. The communication system of claim 1, wherein the client device is further configured to extract a random or pseudo-random number from a decrypted circuit switched message received from the central authority, and wherein the client device is further configured to generate a packet switched registration message in response to the received circuit switched message.

17. The communication system of claim 1, wherein the client device is further configured to encrypt the packet switch registration message using a random or pseudo-random number extracted from a decrypted circuit switched message.

18. The communication system of claim 1, wherein the client device further comprises an authentication factor, and wherein the client device is further configured to include the authentication factor in the packet switched registration message sent to the central authority.

19. The communication system of claim 18, wherein the authentication factor is an electronic serial number associated with the client device.

20. The communication system of claim 18, wherein the authentication factor is a mobile identification number associated with a client device.

21. The communication system of claim 1, wherein the central authority is further configured to receive a packet switched registration message from the client device in response to the circuit switch message sent to the client device, and wherein the central authority is further configured to extract an authentication factor from the packet switched registration message received from the client device.

22. A client device comprising circuit switched data communication capability and packet switched data communication capability, the client device configured to receive a circuit switched message from a central authority requesting that the client device register with the central authority through the packet switched data network and send a packet switched registration message through a packet switched data network to the central authority in response to the received circuit switched message, the client device further configured to send a new packet switched registration message whenever the packet switched data network assigns the client device a new packet switched network address.

23. The client device of claim 22, further configured to include a packet switched network address with the packet switched registration message sent to the central authority.

24. The client device of claim 22, further configured to receive the circuit switched message sent by the central authority and to decrypt the circuit switched message.

25. The client device of claim 22, further configured to extract a random or pseudo-random number from a decrypted circuit switched message received from the central authority, and wherein the client device is further configured to generate a packet switched registration message in response to the received circuit switched message.

26. The client device of claim 22, further configured to encrypt the packet switch registration message using a random or pseudo-random number extracted from a decrypted circuit switched message.

27. The client device of claim 22, further comprises an authentication factor, and wherein the client device is further configured to include the authentication factor in the packet switched registration message sent to the central authority.

28. The client device of claim 27, wherein the authentication factor is an electronic serial number associated with the client device.

29. The client device of claim 27, wherein the authentication factor is a mobile identification number associated with a client device.

30. The client device of claim 22, wherein the client device is further configured to transmit a power-down message to the central authority over the packet switched data network upon the initiation of a power-down sequence of the client device.

31. The communication system of claim 1, wherein the client device is further configured to transmit a power-down message to the central authority over the packet switched data network upon the initiation of a power-down sequence of the client device.

32. The communication system of claim 31, wherein the central authority is further configured to, upon receiving the power-down message from the client device, to transmit an acknowledgement to the client device over the packet switched data network.

* * * * *

UNITED STATES PATENT AND TRADEMARK OFFICE
CERTIFICATE OF CORRECTION

| | | |
|---|---|---|
| PATENT NO. | : 7,664,095 B2 | Page 1 of 1 |
| APPLICATION NO. | : 10/600295 | |
| DATED | : February 16, 2010 | |
| INVENTOR(S) | : Wu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 863 days.

Signed and Sealed this

Thirtieth Day of November, 2010

David J. Kappos
*Director of the United States Patent and Trademark Office*